Dec. 10, 1940. O. MULLER 2,224,521
ADJUSTABLE PIPE FITTING
Filed Aug. 30, 1938
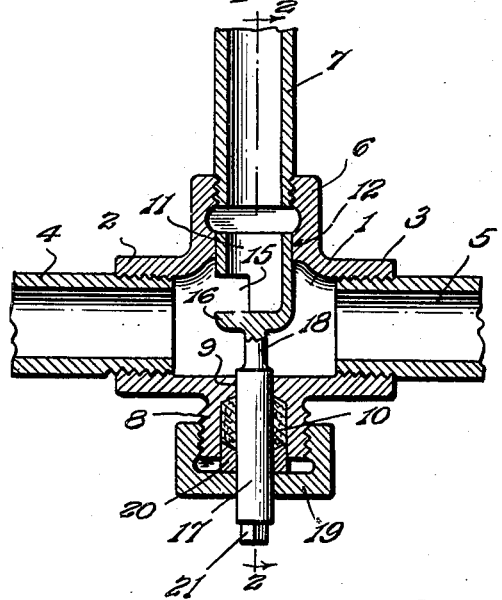
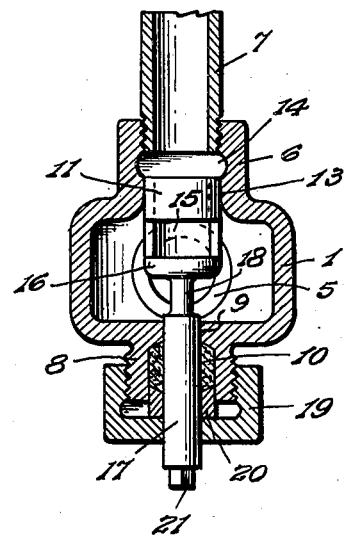
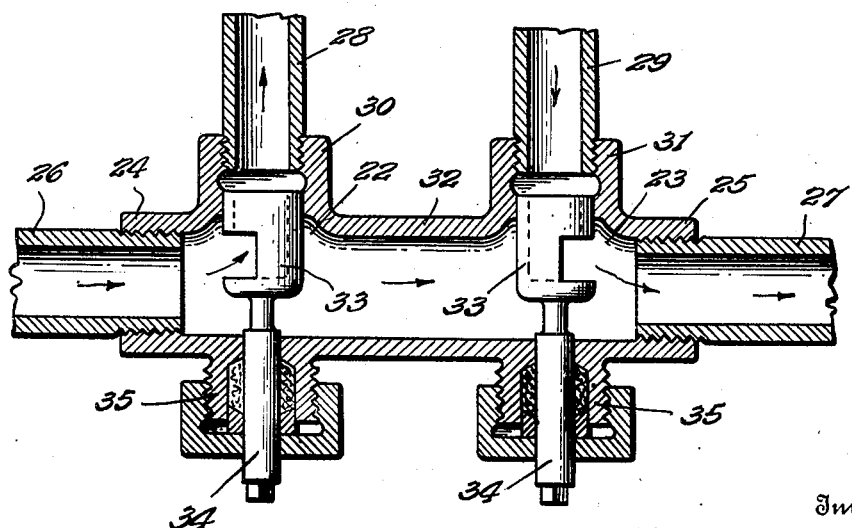
Inventor
Otto Muller.
By Lacy & Lacy,
Attorneys Patented Dec. 10, 1940

2,224,521

UNITED STATES PATENT OFFICE 2,224,521

ADJUSTABLE PIPE FITTING

Otto Muller, New York, N. Y.

Application August 30, 1938, Serial No. 227,568

1 Claim. (Cl. 138—37)

This invention relates to a pipe fitting for use in a pipe line from which branch pipes extend, and it is one object of the invention to provide a fitting serving to connect a branch pipe or pipes with the main line and including adjustable means for controlling flow of fluid under pressure into a branch pipe or causing a suction through the branch pipe into the main line.

It is another object of the invention to so construct the coupling and the means for controlling flow of fluid into a branch pipe or forming suction through a branch pipe that by turning the flow controlling device to adjusted positions the amount of liquid or other fluid delivered into the branch pipe or the suction created through the branch pipe may be controlled.

It is another object of the invention to provide a fitting of this character of such construction that, when a double fitting is provided, controlled flow of fluid under pressure may be obtained through one branch pipe to an apparatus and suction exerted through another branch pipe to return the fluid into the main pipe line.

Another object of the invention is to so construct the pipe fitting and flow controlling member that the flow controlling member may be adjusted by means of a stem projecting externally of the casing of the fitting, thus making it unnecessary to take the fitting apart in order to adjust the flow controlling member. Therefore, a main line having a number of branch pipes leading therefrom may be set up and the fittings then adjusted to obtain the desired flow of fluid through the various branch pipes as desired.

The invention is illustrated in the accompanying drawing, wherein:

Figure 1 is a vertical sectional view taken longitudinally through the improved fitting, a branch pipe and pipe sections of the main pipe line being shown in engagement with the fitting, Figure 2 is a vertical sectional view taken transversely through the fitting along the line 2—2 of Figure 1, and Figure 3 is a vertical sectional view taken longitudinally through a double fitting.

This improved fitting has a body 1 formed of strong metal or other suitable material and provided with necks 2 and 3 for engagement with the pipe sections 4 and 5 of a main pipe line. Midway the length of the body is another neck 6 to receive the end of a branch pipe 7, and below the pipe receiving neck 6 is an externally threaded neck 8 surrounding a reduced opening 9 and constituting a packing gland to receive packing 10. Fluid flowing through the fitting between the pipes 4 and 5 passes about a cup or nipple 11 which is disposed vertically in the fitting with its upper end portion snugly but rotatably received in the unthreaded lower end portion 12 of the bore of the neck 6. A side opening or slot 15 is formed at the lower or inner end of the cup or nipple which end is closed by the head 16, and when the cup is in the position shown in Figure 1 and water or air flowing into the fitting through the pipe 4 and out through the pipe 5, a portion of the fluid will enter the cup through the slot 15 and pass up through the pipe 7 to the place at which the fluid is to be used. The pressure in the branch pipe 7 or the quantity of fluid flowing through the nipple and the pipe 7 will be at a maximum when the slot is in the position shown in Figure 1. By turning the cup or nipple towards a position at right angles to that shown in Figure 1 and disposing the slot transversely of the fitting, the quantity of liquid or air under pressure entering the cup and flowing out through the pipe 7 may be gradually reduced and when the cup is turned to such a position that the slot 15 faces the pipe 5 instead of the pipe 4, the water or air may flow from the pipe 4 through the fitting and through the pipe 5 without entering the cup and flowing up through the pipe 7. It should also be noted that, when the cup is turned to a position in which the slot faces the pipe section 5 instead of the pipe section 4 and water or air is flowing through the fitting from the pipe section 4 to the pipe section 5, a suction will be created downwardly through the pipe 7 instead of fluid under pressure being forced upwardly through the pipe 7. Therefore, the fitting may be used for controlling the pressure or flow of fluid from the main line to an apparatus or for controlling suction through a pipe leading from the apparatus to the main line.

In order that the cup or nipple may be turned to the adjusted positions referred to, there has been provided a stem 17 which is rotatably received in the opening 9 and passes outwardly through the packing gland 8. The inner end portion 18 of this stem which is united to the head 16 of the cup is of reduced diameter in order to reduce to its minimum interference with flow of fluid through the fitting. The packing 10 is disposed within the packing gland 8 about the stem 17 in the usual manner, and when the packing nut 19 is screwed onto the neck or gland 8 to force the packing ring or follower 20 inwardly and compress the packing 10, a tight joint will be formed about the stem and leakage prevented. At its outer end the stem is reduced to form a squared end portion 21 for engagement by a turning tool and by marking an arrow or the like upon the end face of this squared portion a person can determine the direction in which the slot or opening 15 extends. It will thus be seen that a person can adjust the cup or nipple without taking the fitting apart.

In Figure 3, there has been shown a double fitting which consists of a pair of fittings 22 and 23 having necks 24 and 25 to receive ends of the pipe sections 26 and 27 corresponding to the pipe sections 4 and 5 in Figure 1. Branch pipes 28 and 29 have their lower ends screwed into the necks 30 and 31 of the fittings 22 and 23. The two fittings are connected by an integral neck 32 and each has mounted within it a cup 33 having an actuating stem 34 extending downwardly through a packing neck or gland 35. By adjusting the cups 33 as shown in Figure 3, a portion of the liquid or air flowing from the pipe section 26 through the double fitting to the pipe section 27 will be diverted into the branch pipe 28 by the cup 33 of the fitting 22 and this water or air after operating or flowing through a device to which the pipe 28 leads will flow back through the pipe 29 and out through the cup 33 of the fitting 23 and into the pipe section 27. The fact that the slot of the cup 33 of the fitting 23 faces the pipe section 27 and the fluid is flowing past this cup towards the pipe 27 will create a suction through the pipe 29 and assist return flow of the fluid through the pipe 29. It will, of course, be obvious that, when a double fitting is used, the pipes 28 and 29 may extend to separate destinations and one pipe may have water or air forced through it while a suction is created through the other. It will also be obvious that by properly adjusting the cups of the fittings 22 and 23 fluid under pressure may be forced through both of the branch pipes or suction created through both of the branch pipes.

As a practical example of use to which the fitting may be put, it will be assumed that the pipe sections 4 and 5 are portions of the main line of a steam or hot water heating system. In some steam systems single branch pipes lead to radiators but in a hot water system branch pipes lead from the main line to the radiators and return pipes connect the radiators with a portion of the main line for returning water to the boiler. After the piping has been installed and the radiators connected with the branch pipes, the nipples of the various fittings connecting the branch pipes with the main line are adjusted to direct flow of fluid through the branch pipes to the radiators or create suction through branch pipes for drawing water from radiators back to the main line. The radiators may then be tested to see if they are heated properly and if it is found that certain of the radiators are not sufficiently heated or others overheated, it is merely necessary to engage outer ends of the stems of the proper fittings with a wrench and turn the nipples to increase or reduce flow of fluid through the branch pipes leading to the radiators and also make similar adjustments to the nipples of fittings connecting return pipes with the main line. All of the radiators may, therefore, be properly heated and heat evenly distributed throughout a house or other building. If steam is employed as the heating medium, branch pipes and fittings will serve to conduct the steam to the radiators and other branch pipes and fittings may be used to draw air and condensation from the radiators. When hot water is used, certain of the fittings will have their nipples adjusted to cause fluid under pressure to be directed through the branch pipes and companion fittings have their nipples adjusted to create suction through the branch pipes, the double fittings being then preferably used as likelihood of adjusting the wrong fittings will not be present.

While the fittings have been shown formed of cast metal and the pipe sections screwed into them, it is to be understood that the fittings and their nipples may be formed of any material desired, such, for instance, as sheet metal, in which case threaded joints will not be necessary and a suitable type of packing will be provided for the stems of the nipples. It is also to be understood that the fittings may be of any dimensions desired according to uses to which the system equipped with the fittings is to be put. The size and shape of the nipple or cup, the size and shape of the opening therein, and the position of the opening in relation to the center line of the fitting may be varied to suit the conditions and purpose for which the fitting is to be used.

Having thus described the invention, what is claimed as new is:

A fitting of the class described comprising a body having inlet and outlet necks, an intermediate neck for said body extending at substantially right angles therefrom between the inlet and the outlet necks, a nipple in said body and being closed at its inner end, the inner end of said nipple terminating substantially medially of the interior of the body in a position wherein fluid flowing through the body will pass about said nipple, said nipple having an open outer end rotatably engaged in the inner end portion of said intermediate neck and having a side opening adjacent said closed inner end, and a stem on said nipple and extending from the closed inner end thereof through the opposite side of the body from said intermediate neck, said stem being engageable for rotation whereby said nipple may be disposed with the side opening in predetermined relation to the inlet and the outlet necks.

OTTO MULLER.